Patented June 10, 1952

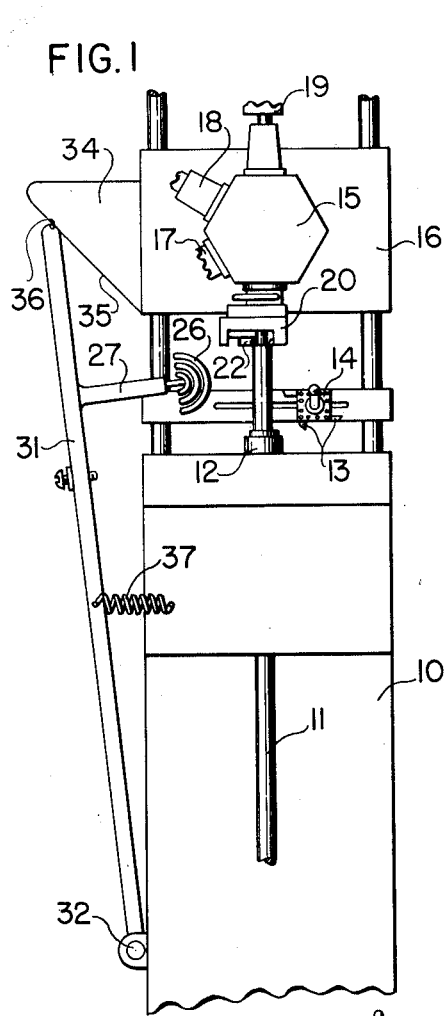
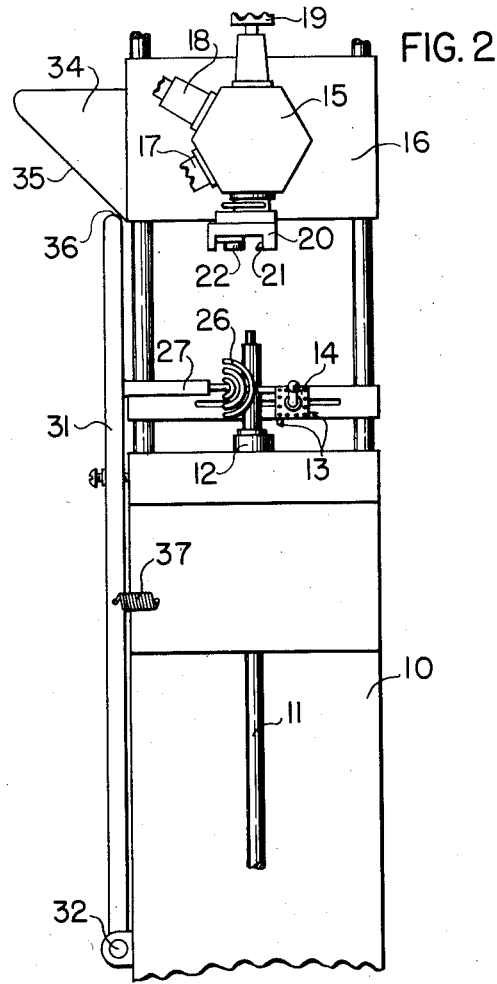
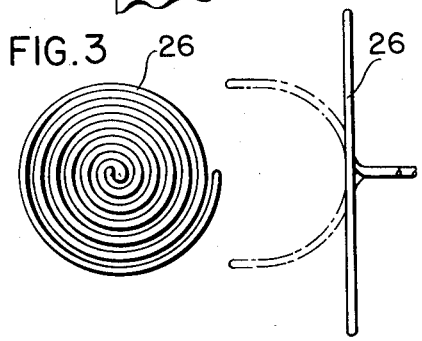
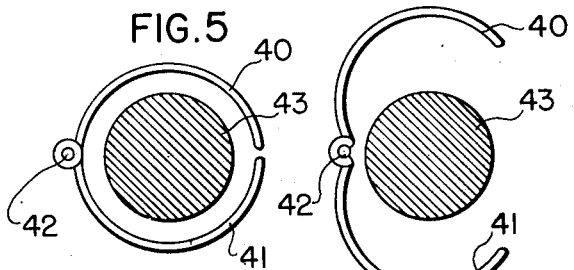

2,600,034

UNITED STATES PATENT OFFICE 2,600,034

METHOD AND APPARATUS FOR APPLYING HEAT IN HOT MACHINING PROCESSES

Richard I. N. Weingart, New York, N. Y.

Application February 8, 1949, Serial No. 75,157

3 Claims. (Cl. 219—1)

1

This invention relates to the art of machining metals to predetermined sizes and shapes by the use of an edged cutting tool which cuts with a shearing action after portions of the metal about to be removed have been raised to a high temperature, but below the melting point of the metal, by the use of a high frequency induction coil.

More particularly the invention relates to an improved method of this character for machining cylindrical stock to cylindrical shapes through the use of an automatic or manually controlled screw machine.

In the hot machining of metal on conventional lathes the induction coil surrounds the work and raises the temperature of the metal over an area whose depth is substantially equal to the depth of the proposed cut and whose width is no greater than the distance transversed by the cutting tool in the time required for heating the metal to the desired temperature.

Another object of the invention is to provide an improved induction heating coil which will allow the coil to be retracted from the work before the cutting operation commences. In many machining operations the induction coil cannot surround the work, particularly in operations wherein a box tool is used. In accordance with one embodiment of the present invention, the coil extends over an arc no greater than 180° and approaches and retracts from the work in a radial direction. It is moved inwardly to heat the work and as soon as the shear strength of the metal has been reduced sufficiently through such heating, the coil is withdrawn and the cutting tool moves in an axial or in a radial direction, to cutting position. A cycle of operation may then be set up wherein the members alternately approach and retract from the work, the cutting part of the cycle continuing only so long as the shear strength of the metal remains sufficiently low so as to secure the optimum benefits of hot machining. As the parent body cools the shear strength increases and the induction coil is again moved to heating position while causing the cutting tool to move away.

For the purpose of accurately determining the shear strength of the metal in order to ascertain the need for greater or lesser heat the method disclosed in my co-pending application Serial No. 75,158, now abandoned, filed on even date herewith, may be employed.

In the drawing:

Fig. 1 is a broken plan view of a turret screw machine equipped with apparatus of the present invention, the view showing the tool in cutting position and the heating coil in retracted position.

Fig. 2 is similar to Fig. 1 but shows the parts in the reversed position.

Fig. 3 is a plan view of a heating coil of the present invention in its initial flat spiral shape.

Fig. 4 is a side elevation thereof, the view showing in broken lines the final shape of the coil.

Fig. 5 is a side elevation of a modified coil which is arranged to surround the work, the coil being formed in two hinged sections.

Fig. 6 is a side elevation showing the same coil in open position.

The numeral 10 indicates the bed of a conventional screw machine, either of the automatic or semi-automatic type, the work, in this case a length 11 of bar stock being fed through a collet 12. A plurality of tools 13, are mounted in a tool support 14 at least one of which is a cut-off tool. The support is rotatable in order to bring a desired tool into contact with the work.

A rotatable turret 15 mounted on a support 16 on the bed is arranged to be moved toward and away from the work and has means for supporting various types of tools. Several of these tools are indicated at 17, 18 and 19, and at 20 there is illustrated a box tool having portions 21 and 22 which engage the work.

An induction heating coil 26 is carried on a support 27 which is mounted on an arm 31 which is pivoted at one side of the bed at 32.

The construction of the coil is shown in Figs. 3 and 4, the tube first being coiled as a flat spiral, the convolutions of the spiral being relatively close together but, nevertheless, spaced from each other. After they are formed in this fashion, the flat spiral is bent to assume the arcuate contour shown in broken lines in Fig. 4. The coil may then extend around substantially 180° of the work. When this coil is in the position shown in Fig. 2 it is in heating position and the tools 13 on support 14 may be utilized if desired. The turret 15 is in retracted position, however.

Support 16 for the turret has an extension 34 provided with a cam surface 35. Thus, as the turret is moved inwardly to operative position the cam surface engages the free end 36 of arm 31 and moves the coil to the position shown in Fig. 1. A spring 37 urges the free end of the arm against the cam surface.

The operation of the apparatus is as follows: The support 16 is in the retracted position of Fig. 2 and the coil 26 partially surrounds the work which is rotating. In this position any of the tools 13 may be utilized, if desired, without retracting the heating coil. When the shear strength of the metal has been reduced sufficiently, through the application of heat, turret 15 may be advanced toward the work and the coil is thereby retracted as shown in Fig. 1. When the machining operation is completed the finished article is cut from bar stock by one of tools 13 and the operation repeated.

In some instances the shear strength of the metal may be increased beyond a desired maximum, due to cooling of the metal, before the cutting operation is finished. In such an event the turret is retracted for the application of heat and the cutting thereafter continued.

The coil shown in Fig. 5 may comprise two coils substantially the same shape as that shown in Fig. 1 which are suitably hinged together to substantially completely surround the work. These two coils 40 and 41 may each be formed in the flat spiral shape shown in Fig. 3 and then bent to assume the arcuate shape shown. Hinge means 42 are employed for mounting the coils in the manner shown in Fig. 5 wherein they surround the work 43 substantially completely. In Fig. 6 the coils have been opened. Suitable means (not shown) may be employed for opening the coils to the latter position when the tool is to be moved to cutting position.

It will be apparent that many changes and modifications may be made in the method and apparatus described and illustrated herein without departing from the spirit of the invention as defined by the appended claims.

What I claim is:

1. The method of machining metal to cylindrical shapes which consists in alternately applying heat to localized portions of the work by the use of a high frequency induction coil to reduce the shear strength of the metal and then retracting said coil and removing portions of the work so heated by the use of an edged cutting tool which cuts with a shearing action, and continuing the cutting until the shear strength of the metal increases to a point wherein a further application of heat is required.

2. The method of machining metal to cylindrical shapes by a work handler and edged cutting tool which cuts with a shearing action and an induction heating coil which applies localized heat to portions of the work about to be removed in order to reduce the shear strength of the metal, which consists in positioning the coil relative to the work and raising the temperature of the latter to a desired heat below the melting point of the metal and then moving the cutting tool into cutting relation with the work while retracting said coil, and continuing the cutting until the shear strength of the metal increases to a point wherein a further application of heat is required.

3. An apparatus for machining metal to predetermined shapes comprising a work handler, an edged cutting tool which cuts with a shearing action, means providing relative movement between the work and the tool, an induction heating coil for applying localized heat to portions of the work about to be removed and means for retracting the coil from the work, after such heating has been effected, and for moving the cutting tool into cutting relation with the work.

RICHARD I. N. WEINGART.

REFERENCES CITED

The following references are of record in the file of this patent:

UNITED STATES PATENTS

| Number | Name | Date |
| --- | --- | --- |
| 1,813,591 | Ulrey | July 7, 1931 |
| 1,983,242 | Rohn | Dec. 4, 1934 |
| 2,249,909 | Pisarev | July 22, 1941 |
| 2,275,763 | Howard et al. | Mar. 10, 1942 |
| 2,412,797 | Berliner | Dec. 17, 1946 |
| 2,463,669 | Wright | Mar. 8, 1949 |